United States Patent [19]
Okubo et al.

[11] 3,983,097
[45] Sept. 28, 1976

[54] METHOD OF PRODUCING HIGH MOLECULAR DERIVATIVES

[76] Inventors: Tsuneo Okubo, Nishide, Fushimi, Kyoto; Norio Ise, Nakanosaka, Kita, Kyoto, both of Japan

[22] Filed: Feb. 21, 1975

[21] Appl. No.: 551,909

[30] Foreign Application Priority Data
Mar. 6, 1974 Japan.............................. 49-26605

[52] U.S. Cl. .............................. 526/49; 260/2.1 E; 260/112 R; 260/295 R; 260/296. R; 260/296 D; 526/46; 526/23
[51] Int. Cl.² ...................... C08C 19/22; C08F 8/30
[58] Field of Search ........ 260/88.3 R, 2.1 E, 112 R, 260/80 P; 450/616, 619.5

[56] References Cited
UNITED STATES PATENTS

| | | | |
|---|---|---|---|
| 2,972,536 | 2/1961 | Laakso et al. | 260/88.3 R X |
| 2,972,538 | 2/1961 | Laakso et al. | 260/88.3 R X |
| 3,022,253 | 2/1962 | McMaster | 260/88.3 R X |
| 3,125,550 | 3/1964 | Laakso et al. | 260/88.3 R X |

*Primary Examiner*—William F. Hamrock

[57] ABSTRACT

High molecular derivatives (1) including at least a recurring structural formula:

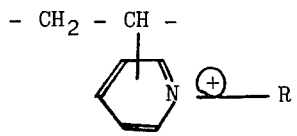

(wherein R means an organic residue except for 2,4-dinitrophenyl radical in its backbone or side chain) are produced by subjecting a polymer (2) including at least a recurring structural unit of the formula:

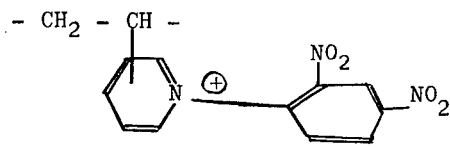

and an amino-containing organic substance (3) of the general formula:

RNH₂

(wherein R has the meaning defined above) to a substitution reaction in a suitable liquid reaction medium and under neutral to alkaline conditions.

3 Claims, No Drawings

METHOD OF PRODUCING HIGH MOLECULAR DERIVATIVES

This invention relates to a method of producing various high molecular derivatives from reactive polymers which include predetermined structural units in their backbone or side chain.

More particularly, this invention relates to a novel method of producing high molecular derivatives (1) including at least a recurring structural unit of the formula:

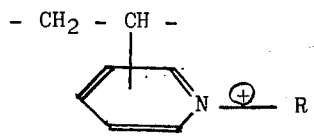

(wherein R means an organic residue except for 2,4-dinitrophenyl radical)

Heretofore, various homopolymers and copolymers of vinyl pyridines, such as 4-vinylpyridine, 2-vinylpyridine, 2-methyl-5-vinylpyridine and 3-vinylpyridine, and the quaternized products of such polymers or copolymers have been considered useful in various fields, for example in the production of synthetic rubbers, adhesives, synthetic fibers, ion exchange resins, catalysts, pharmaceutical coatings, flocculating agents, antistatic agents, emulsifiers, etc. and further developments are expected.

The object of the present invention is to provide a novel method of producing one of the quaternized derivatives of vinyl pyridine-polymers which is useful, not only in the above-mentioned fields, but also in the inherent applications such as fixing agents for enzymes, dyestuffs and sensitizers.

Another object of the invention is to produce high molecular derivatives (1).

According to the present invention, for attaining the afore-mentioned objects, the above high molecular derivatives (1) are produced by a method which comprises reacting a polymer (2) including at least a recurring structural unit of the formula:

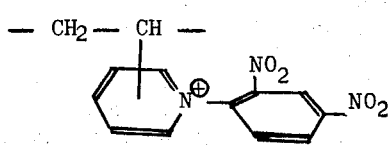

with an amino-containing organic substance (3) of the general formula:

R NH$_2$ (wherein R has the meaning defined above) in the presence of a suitable liquid reaction medium and under neutral to alkaline conditions.

The reaction according to the invention may be illustrated by the following equation:

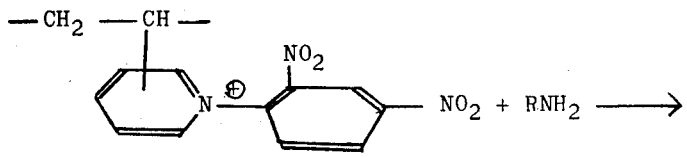

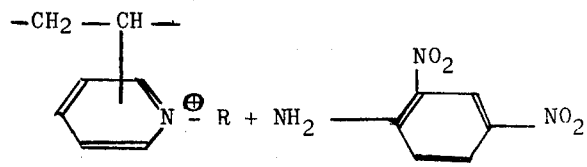

The reactive high polymer (2) which is employed as the starting material in the method of this invention, can be obtained by reacting a member of the group consisting of homopolymers of vinyl pyridines, e.g. 4-vinyl pyridines, 2-vinylpyridine, and 3-vinylpyridine, binary and ternary copolymers of vinylpyridines with other unsaturated monomers such as olefins, e.g. ethylene, propylene, etc., vinyl chloride, vinyl acetate, acrylonitrile, acrylic acid, methacrylic acid, styrene, butadiene, isoprene, etc., derivatives of homopolymers and copolymers of vinyl pyridines such as those partially quaternized with quaternizing agents such as alkyl halides, with a 1-halo-2,4-dinitrobenzene (4) of the general formula:

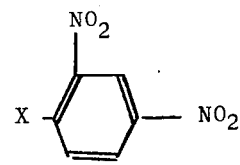

(wherein X is a halogen atom i.e. chlorine, bromine, fluorine or iodine). The preferred embodiment is 1-chloro-2,4-dinitrobenzene.

The copolymer of vinyl pyridines which reacts with 1-halo-2,4-dinitrobenzene preferably contain at least 3 mol % of vinyl pyridine. As a matter of course, the homopolymer of N-vinyl pyridine can not be used in the invention. In the reaction of vinyl pyridine polymers with 1-halo-2,4-dinitrobenzene to obtain the reactive high polymer (2), it is desirable that at least 7 mol % of the vinyl pyridine units are quaternized. However, excessive quaterization causes the carbonization of the vinyl pyridine polymers, and hence the degree of the quaternization of the vinyl pyridine polymers should be not higher than 80 mol % of the vinyl pyridine unit.

The production of the aforementioned reactive high polymer (2) is usually carried out at room temperature in the presence of a solvent for said vinyl pyridine polymer or copolymer in a homogeneous solution. The solvent used for this purpose may, for example, be methanol, ethanol, nitromethane, nitroethane, dimethylformamide or dimethylsulfoxide.

However, depending upon the final uses for the high polymer derivatives (1) of this invention, one may deliberately select the insoluble members of the aforesaid vinylpyridine copolymers and modified polymers and conduct the reaction in a heterogeneous system.

In the practice of this invention, which of the aforementioned reactive high polymers (2) is to be employed as a starting material depends upon the final use or object. The most proper reactive polymer (2) may be selected from among the high polymers produced under the varied conditions described hereinbefore.

Examples of the amino-containing organic substances (3) which are the mating compounds to be employed this invention, there may be mentioned various amino acids, amino-alcohols, enzymes, coenzymes, etc. Stated differently, all low molecular and high molecular weight organic substances containing at least one amino group can be employed.

By way of example and not limitation, the following amino-containing organic substances (3) are mentioned as suitable: the alkyl amines such as lauryl amine, cetyl amine, hexamethylene diamine; the amino alcohols such as ethanol amine, 2-amino-1-butanol; the amino acids such as glycine, alanine systeine, lysine, penicillamine; guanidine; alicyclic compounds containing amino groups such as amantadine and cyclohexylamine; the aromatic amines such as butyl aniline, trimethylaniline, naphthylaniline, tyrosine, phenylalanine, benzedrine; the hetrocyclic compounds containing the amino groups such as histamine, histidine, adenine, guanine, tryptamine and the polypeptides such as serum - albumin; the enzymes such as chymotrypsine, urease; the aminosilane compounds such as 2-(methyl-dimethoxy-silyl-propylamino)-ethylamine. Amide compounds are not suitable as the amino-containing organic substances in this invention.

The contemplated reaction is conducted in the presence of a liquid reaction medium and while the reaction system is maintained under neutral to alkaline conditions. The reaction cannot be successfully conducted under acidic conditions, because the amino groups will become protonated. The reaction is ordinarily carried out in the presence of a liquid reaction medium, usually in a homogeneous system, in a polar solvent in which both the aforementioned high polymer (2) and the amino-containing organic substance (3) are soluble. Examples of the solar solvent are methanol, ethanol, water, dimethylformamide or mixtures of such solvents. It should, of course, be understood that according to the types and properties of said reactive high polymer (2) and amino- containing organic substance (3), the reaction may be conducted in an heterogeneous system.

As mentioned above the reaction between the reactive high polymer (2) and the amino-containing organic substance (3) in this invention is a unique one and the reaction proceeds under relatively mild conditions. In this reaction the 2,4-dinitrophenyl radical combined with the reactive high polymer (2) may be quantitatively substituted with an R radical originating from the amino- containing organic substance (3). In general, the reaction can proceed at about room temperature. While a reaction time of 1–12 hours is preferred, the reaction time is determined according to the extent of the reaction desired. The amino compounds are generally employed in an amount of at least 1 mol per mol of the 2,4-dinitrophenyl radical of the starting material.

As a modification of the present method of producing the aforementioned high molecular derivative (1), the following procedure may be followed. The reactive high polymer (2) is pre-treated with a powdered material carrying an aminosilane compound on the surface so that some of the

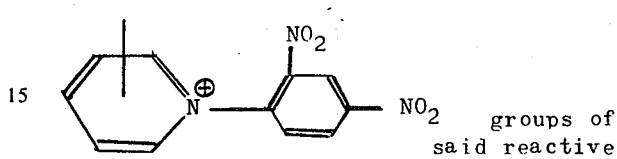

groups of said reactive polymer (2) will chemically combine with the powdered material. The resulting reactive matrix material is reacted with said amino-containing substance $RNH_2$ (3). Examples of said powdered material are such oxides as alumina, titanium dioxide, zirconia, silica, magnesia etc.; such silicates as asbestos, actinolite, crosidolite; corundum, bauxite, carbon black, and other materials which have hydroxyl groups on the surface and have a diameter of about 1 to 3 microns.

This procedure is useful in the production of commercial catalysts by the immobilization of enzymes.

Thus, the present invention provides a method for producing a large number of different high molecular derivatives (1) through combinations of the aforementioned reactive high polymers (2) with said amino-containing substances (3).

The following examples are intended to merely illustrate this invention and should by no means be construed as limiting the invention.

EXAMPLE 1

10g. of poly-4-vinylpyridine was dissolved in 200 ml. of methanol. 20g. of 2,4-dinitrochlorobenzene in 50ml. of methanol was then added to the resulting solution. The mixture was stirred at room temperature (25°C) for about 10 hours. About 1 hour after the reaction was started, the reaction mixture assumed a brownish color and, after 10 hours, it turned red. After a total of 10 hours, the reaction mixture was added to a large excess of dioxane to precipitate the reaction product. The precipitate was recovered, dried under reduced pressure, dissolved in ethanol and again added to dioxane. The purified product was dried under reduced pressure to recover 10.8 g. of a brown powder. Elemental analysis of the product showed that it was a poly-4-vinylpyridinium salt which was 18% quaternized with 2,4-dinitrochlorobenzene.

Analysis (%): Calcd. for $(C_7H_7N)_{0.82}(C_{13}H_{10}N_3O_4Cl)_{0.18}$: C, 68.55; H, 5.33; N, 13.46; Cl, 4.52. Found: C, 68.24; H, 5.42; N, 13.34; Cl, 4.52. 7.0g of the resulting partially quaternized poly-4-vinylpyridine was dissolved in 100ml. of methanol. 3.0g. of histamine powder was added to this solution at room temperature. As the histamine started to dissolve in the solution, the system turned reddish-violet. By the end of 2 hours, the color of the solution was yellow. Then, the reaction mixture was filtered to remove the byproducts and the filtrate was dialyzed in a celophane bag against water for 3 days. The solution was concentrated under reduced pressure and the concentrate was added to dioxane. The resulting precipitate was dried by heating under reduced pressure to recover 6.5 g. of a yellow powder. Elemental analysis revealed that the product was a poly-4-vinylpyridine which was 18% quarternized by ethyl-histidyl groups.

Elemental analysis (%): Calcd. for $(C_7H_7N)_{0.82}(C_{12}H_{14}N_3Cl)_{0.18}$: C, 73.78; H, 6.43; N, 14.82; Cl, 4.97. Found: C, 73.92; H, 6.52; N, 14.75; Cl, 4.95.

EXAMPLE 2

2.5g. of a poly-4-vinylpyridine (70% quaternized with benzyl chloride and 28% with 2,4-dinitrochlorobenzene) was dissolved in 100ml. of water. 5ml. of an aqueous solution of 0.08 of tryptamine was added to the resulting solution, 2.5g. of poly-4-vinylpyridine (70% quaternized with benzyl chloride and 28% with 2,4-dinitrochlorobenzene) was dissolved in 100ml. of water. 5ml. of an aqueous solution of 0.08 of tryptamine was added to the resulting solution, followed by the addition of 5 ml. of a solution of 0.12 g. of cetylamine in ethanol. Lastly, 5 ml. of a solution of 0.30 g. of amantadine in ethanol was added. As each amine was added, the solution turned dark-violet. Upon standing at room temperature for 12 hours, the solution became yellow. This yellow solution was dialyzed against pure water for 3 days after which the solution was concentrated under reduced pressure and added to dioxane. The resulting precipitate was dried by heating under reduced pressure to recover 1.9 g. of a white powder. This product was a new high polymer corresponding to poly-4-vinylpyridine which had been 5% quaternized by ethyl-indole, 5% quaternized by a cetyl group, 18% quaternized by adamantane, and 70% quaternized by a benzyl group.

Analysis: Calcd. for $(C_7H_7N)_{0.02}(C_{17}H_{17}N_2Cl)_{0.05}(C_{23}H_{40}NCl)_{0.05}(C_{17}H_{22}NCl)_{0.18})C_{14}H_{14}NCl)_{0.70}$: C, 73.10; H, 6.80; N, 5.97; Cl, 14.13. Found: C, 73.15; H, 6.88; N, 5.88 Cl, 14.21.

EXAMPLE 3

22.4g of a reactive high polymer (i.e. a poly-2-vinylpyridine 50% quaternized with butyl bromide and 25% with 2,4-dinitrochlorobenzene) was added to 500 ml. of a 1:1 mixture of water and ethanol. 1.43g. of aminoethyl-adenine was dissolved in the resulting solution followed by 1.21g. of phenethylamine. About 2 hours after the addition was complete, the solution turned yellow. Then, 15 ml. of a solution of 0.5 g. of hexamethylenediamine in ethanol was added, whereupon the reaction system turned violet. White turibity ensued, giving rise to precipitates. The precipitates were collected, washed well with ethanol and dried by heating under reduced pressure to recover 21.7 g. of a resin. This product was insoluble in all the solvents surveyed. This resin was a new cationic high molecular electrolyte resin, quaternizated with butyl, ethyladenine and phenethyl groups and cross-linked with hexamethylene.

Analysis: Calcd. for $(C_7H_7N)_{0.25}(C_{11}H_{16}NBr)_{0.50}(C_{14}H_{15}N_6Cl)0.08(C_{15}H_{16}NCl)_{0.10}(C_{10}H_{13}NCl)_{0.07}$: C, 60.77; H, 6.45; N, 9.39. Found: C, 60.69; H, 6.49; N, 9.45.

EXAMPLE 4

A reactive high polymer was prepared by quaternizing the pyridyl groups of a vinylacetate-4-vinylpyridine copolymer (having a mole ratio of 0.71 to 0.29) with 2,4-dinitrochlorobenzene. 10ml. of cetylamine was added to the resulting solution whereupon the solution turned violet, and after 2 hours turned yellow. The reaction mixture was poured in water and the resulting precipitate was dried by heating under reduced pressure to recover 12.2 g. of a vinyl acetate-N-cetylated-4-vinylpyridine copolymer as a white powder.

Analysis (%): Calcd. for $(C_4H_6O_2)_{0.71}(C_{23}H_{40}NCl)_{0.29}$: C, 68.31; H, 9.49; N, 2.43; Cl, 6.17. Found: C, 68.28; H, 9.55; N, 2.39; Cl, 6.11.

EXAMPLE 5

5g. of poly-4-vinylpyridine was dissolved in 50ml. of dimethylformamide. This was followed by the addition of 2.9g. of 2,4-dinitrochlorobenzene. The mixture was stirred at 60°C for about 1 hour and the resulting dark black-violet solution was diluted 10-fold with dimethylformamide. 500ml. of finely pulverized silica gel, pretreated with dimethoxymethylsilylpropylaminoethylamine, was added to this dilute solution. and the reaction was allowed to take place under gentle stirring at 60°C for about 1 hour. The reaction system was filtered with a No. 1 glass filter and washed well with HCl-acidic dimethyl-formamide. The solution was washed twice with HCl-acidic ethanol and allowed to dry in a current of air. The procedure provided a powdered reactive carrier which was free-flowing and yellowish orange tan in color.

Ten ml. of this reactive carrier were washed well with an aqueous solution of sodium hydroxide (pH 9) and added to 50 ml. of an aqueous solution of crude urease [sword bean (Canavalia gladiata D.C.) powder] (1 g/dl) (pH 9). The mixture was stirred at 30°C for about 30 hours to cause the reactive carrier to react with the urease. The reaction system was filtered with a No. 1 glass filter and, then, washed with glycine buffer (Sorensen buffer, pH 10.4) on a filter, whereby the residual active sites were reacted with the amino groups of the glycine. Finally, the product was washed well with distilled water. The resulting urease-support was a brownish-tan powder. 10ml. of the urease support was added to 100ml. of an aqueous solution of urea (1g/dl.) The amounts of ammonia evolved were as follows.

| Time | Concentration of ammonia |
| --- | --- |
| 5 hours | $3.4 \times 10^{-6}$ $M^{-1}$ |
| 10 " | 7.0 × " |
| 15 " | 10.8 × " |
| 20 " | 13.7 × " |
| 25 " | 17.6 × " |

What we claim is:
1. A method for producing high molecular weight derivatives containing at least a recurring unit of the formula:

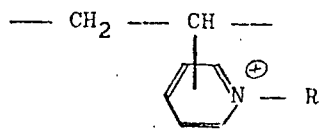

wherein R means an organic residue except for 2,4-dinitrophenyl radical which comprises reacting homopolymers or copolymers of vinyl pyridine including at least a structural unit

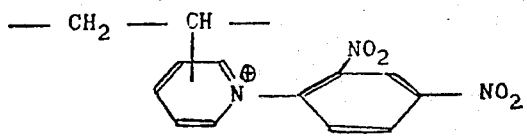

in its backbone or side chain with an amino-containing organic compounds represented by the general formula: $RNH_2$ wherein R has the meaning defined above in the presence of a liquid reaction medium under neutral to alkaline conditions.

2. A method according to claim 1, wherein the polymer including at least a structural unit:

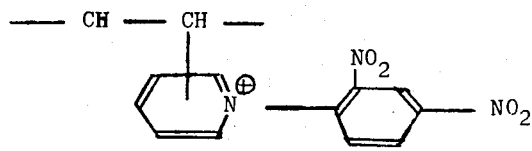

is a polymer obtained by reacting homopolymers or copolymers of vinyl pyridines with 1-halo-2,4-dinitrobenzene of the general formula:

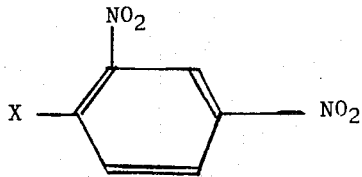

wherein X means a halogen atom.

3. A method according to claim 1, wherein the amino-containing organic compound is one selected from the group consisting of alkyl amines, amino alcohols, amino acids, guanidines, alicyclic compounds containing amino groups, aromatic amines, heterocyclic compounds containing amino groups, polypeptides, enzymes, aminosilane compounds.

* * * * *